United States Patent
Roper et al.

(10) Patent No.: US 6,900,663 B1
(45) Date of Patent: May 31, 2005

(54) LOW VOLTAGE DIFFERENTIAL SIGNAL DRIVER CIRCUIT AND METHOD

(75) Inventors: Weston Roper, Shakopee, MN (US); Xiaoxin Feng, Eden Prairie, MN (US)

(73) Assignee: Cypress Semiconductor Corporation, San Jose, CA (US)

( * ) Notice: Subject to any disclaimer, the term of this patent is extended or adjusted under 35 U.S.C. 154(b) by 41 days.

(21) Appl. No.: 10/288,003

(22) Filed: Nov. 4, 2002

(51) Int. Cl.[7] ............................................. H03K 19/094
(52) U.S. Cl. ............................................ 326/83; 326/87
(58) Field of Search ........................ 326/82–83, 86–87; 327/108–109; 330/258–261

(56) References Cited

U.S. PATENT DOCUMENTS

| | | | | |
|---|---|---|---|---|
| 5,939,904 A | * | 8/1999 | Fetterman et al. | 327/67 |
| 5,986,479 A | * | 11/1999 | Mohan | 326/115 |
| 6,603,348 B1 | * | 8/2003 | Preuss et al. | 327/563 |
| 6,661,288 B2 | * | 12/2003 | Morgan et al. | 330/258 |

* cited by examiner

Primary Examiner—James H. Cho
(74) Attorney, Agent, or Firm—Wagner, Murabito & Hao LLP

(57) ABSTRACT

Embodiments of the present invention relate to a low voltage differential signal driver (LVDS) circuit which comprises a current source, logic controlled switches for controlling the driver's output, an electronic load circuit coupled across the circuit, and a common-mode resistor feedback circuit coupled across the circuit, in parallel with the RC load, for tuning the driver's impedance. The driver is enabled to operate without op-amps and achieves optimum performance at 1.8 v supply voltages.

17 Claims, 5 Drawing Sheets ic devices.

LOW VOLTAGE DIFFERENTIAL SIGNAL DRIVER CIRCUIT AND METHOD

FIELD OF THE INVENTION

Embodiments of the present invention relate to the field of low voltage semiconductor devices.

BACKGROUND OF THE INVENTION

Low-voltage differential signaling (LVDS) is a differential interconnectivity standard. It uses a low voltage swing of approximately 350 mV to communicate over a pair of traces on a PCB or cable.

Electronic devices that require high speed communications, either internally or with other devices, use LVDS drivers extensively. Moving high-bandwidth digital video data, for example, within modern consumer appliances and between them is a very challenging task. This requires the speed that low power LVDS offers.

Traditional LVDS drivers typically have architectures that require operational amplifiers (op-amps) to produce the voltages that control the current from two current sources and logic-controlled switches determine the direction of the current across a load. The direction of the current across the load determines the LVDS signal polarity. LVDS load and signaling levels are specified by standards such as the TIA/EIA-644 standard. The current source, supply voltage, switches and op-amp bandwidth, in addition to the time constant of the LVDS load, determine the maximum speed of the driver. The swing and common mode voltage are difficult to control and maintain over carriers.

Conventional art FIG. 1 illustrates an exemplary LVDS driver using operational amplifiers (op-amps). Op-amps 101 and 102 typically control the current through driver 100 by controlling the current flow through current supplies 103 and 104. Logical switches 108 and 110 control the current flow direction through LVDS load 105, in this example a resistor, in order to produce a voltage across the load. That voltage, at nodes 120 and 121, must meet the LVDS specification. such as that in the TIA/EIA-644 standard referred to above. It is noted that the standard also includes maximum of 5 pF for parasitic capacitance, as shown at 106.

Op-amp structures, particularly, have had an impact on device speeds. With currently available process technologies, an op-amp which steers current sources on the low side of a driven signal must utilize complex topologies to be used in a 1.8V system. This is mandated by the 1.2V common-mode LVDS requirement when the supply voltage is 1.8V. This forces the design of the op-amp to be a multi-pole system and stability becomes a concern.

The output impedance of a typical LVDS structure is a sum of switch resistances and an LVDS load resistor, specified in the standard as 100 ohms, and LVDS load capacitance is specified at no more than 5 pF. This results in a significant RC delay that limits the maximum speed available for any given supply power.

Modern LVDS signaling specifications require a relatively high voltage power supply, e.g., on the order of 2.5–3V. With emerging chip technologies enabling sub-1.8V power supplies, building high-speed, TIA complaint, LVDS circuits becomes a challenge. Many chips have implemented split rail architectures to enable larger input/output (I/O) voltages. Traditional architectures, though, have not been able to take advantage of the emerging low power supply technologies. This has become even more important as power supplies have continued to shrink.

By requiring op-amps to control the current sources, the flexibility or programmability of the traditional driver architecture has been limited to the input characteristics of the op-amps. This does not enable most traditional LVDS drivers to be used at multiple power supply voltages and the tradeoff of power versus speed is not adjustable with existing architectures.

SUMMARY OF THE INVENTION

Accordingly, embodiments of the present invention are directed to a novel method and electronic circuit by which low voltage differential signaling can be effected at very fast rates and at low power consumption. Furthermore, embodiments are tunable to specific applications, both in initial design and in use.

Embodiments of the present invention relate to a low voltage differential signal driver (LVDS) circuit which comprises a current source, logic controlled switches for controlling the driver's output, an electronic load circuit coupled across the circuit, and a common-mode resistor feedback circuit coupled across the circuit, in parallel with the RC load, for tuning the driver's output impedance. The driver is enabled to operate without op-amps and achieves optimum performance at 1.8V supply voltages.

Embodiments of the present invention can achieve signaling rates greater than 800 MHz by decreasing the output impedance during transition times. The circuit uses current mirrors and a common-mode feedback circuit to generate the proper LVDS signaling levels. No operational amplifiers (op-amps) are needed to control the current sources, which enables both optimum performance at 1.8V or lower supply voltages and design flexibility to manage speed versus power opportunities. Embodiments enable smaller RC-delays at the driver's output during signal transition than traditional LVDS drivers. This maximizes speed and stability for a given power and provides for significant flexibility because the designer can "program" the driver, by proper component selection, for a variety of common-mode differential signaling levels.

Specifically, in one embodiment, a 100 ohm, 5 pF, load creates a 50 pico-second RC delay that is managed by the driver circuit to meet desired operating speeds. Through the use of a common mode feedback circuit, embodiments of the present invention insert a small resistance in parallel with the LVDS load to decrease the effective LVDS output impedance and therefore decrease the delay inherent in the load. A resistance of 25–40 ohm, for instance enables the LVDS load induced to be decreased by approximately 70%. An impedance in this range still allows the driver to satisfy the TIA specified short circuit current specifications.

The resistance acts as a common-mode feedback circuit for the current sources. The current sources enable ample current to allow the LVDS signaling levels to be satisfied. This approach eliminates the need for operational amplifier control of the current sources. The common-mode feedback is adequate for controlling the current sources without the need of an active controller. This feature allows operation at lower power supply voltages.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The operation and components of this invention can be best visualized by reference to the drawings.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it should be understood by one of ordinary skill in the art that the present invention may be practiced without these specific details. In other instances, well-known methods, procedures, components, and circuits have not been described in detail so as not to unnecessarily obscure aspects of the present invention. At times, concepts disclosed in this discussion of embodiments of the present invention will be made more readily apparent by reference to the Figures.

Figure 1:
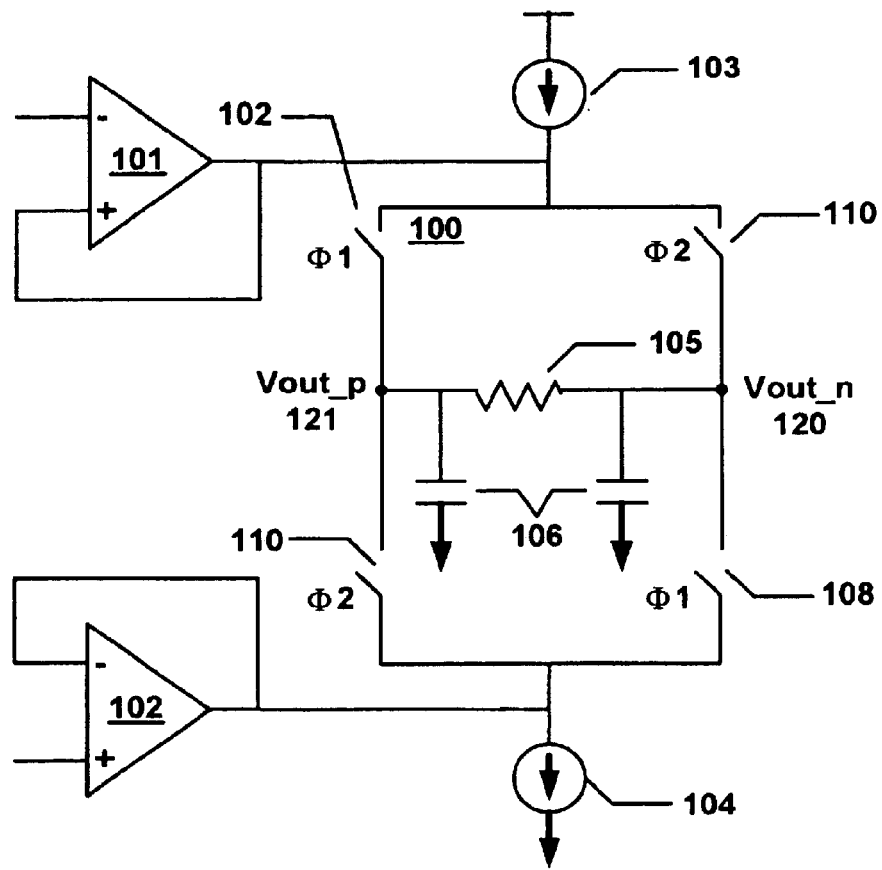
FIG. 1 illustrates an LVDS circuit in accordance with an embodiment of the present invention.
Figure 2:
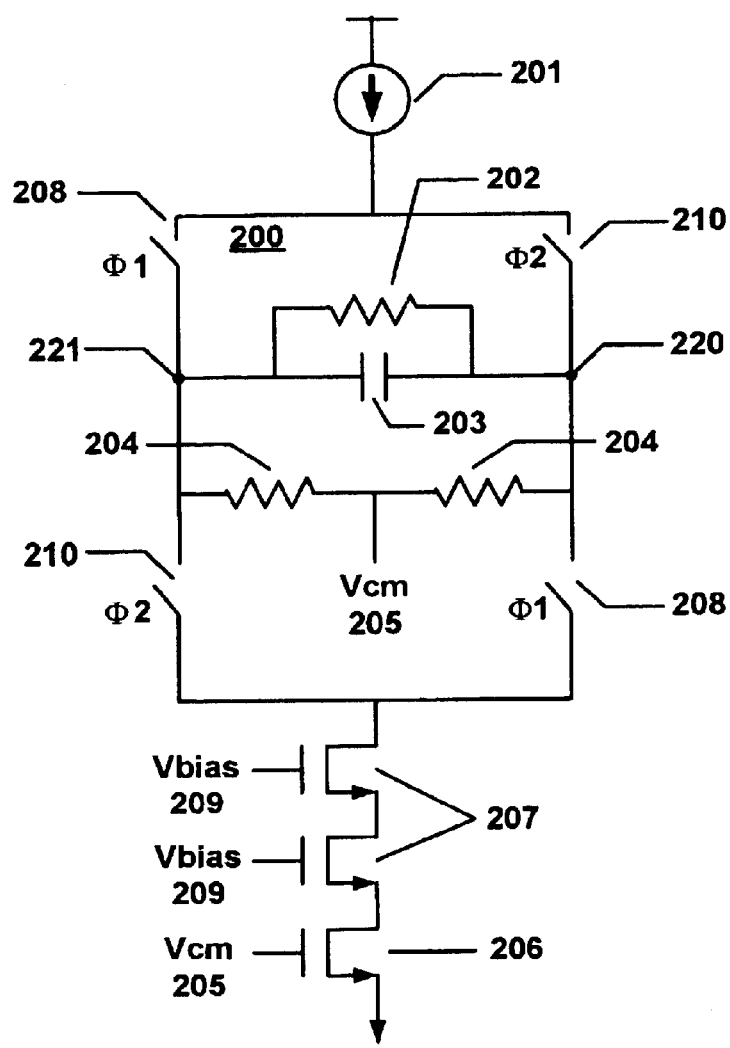
FIG. 2 illustrates an LVDS circuit in accordance with an embodiment of the present invention.

FIG. 2 illustrates one embodiment of the present invention, a low voltage differential signal driver circuit. Circuit 200 is characterized by four logical switches, 208 and 210, to switch current across a load. Current source 201 feeds the current controlled by Φ1 switches 208, Φ2 switches 210, and mosfets 206 and 207 which limit current sinking as required by the voltage levels of Vcm, 205, and Vbias, 209. Mosfets 207 constitute a Vbias cascode circuit under Vbias 209. Vcm 205 is driven by the center tap of common-mode resistor network 204 and behaves as a reference voltage. Vbias 209 is controlled by switch bias logic. It is noted that mosfets 206 and 207 operate below saturation range so act as resistors to current through circuit 200. It is also noted that mosfet 206 acts as a current mirror to current source 201.

Also in FIG. 2, an LVDS load is illustrated by resistor 202 and capacitor 203. It is noted here that the standard specification for LVDS, such as that in the TIA/EIA-644 standard, requires a specific resistance load, between the differential signal nodes, of 100 Ohms. The resistive load is in parallel with LVDS impedance load capacitor, 203, which is specified at up to 5 pF. It is also noted that capacitor 203 is generally the function of the inevitable parasitics associated with device manufacture and is typically not a specific device feature. LVDS load 202 is shown between nodes for out_p, 220, and out_n, 221, which are shown here to illustrate a differential signal output.

At the higher switching rates demanded by faster applications, the RC delay of the specified LVDS load is offset by common-mode feedback circuit 204. The resistance of the common-mode feedback circuit, in parallel with the LVDS RC load, lowers the driver's output impedance during transition and reduces the LVDS load's RC delay. This enables the driver to function at switching rates higher than 800 MHz at power supply voltages of less than 1.8 V. Though embodiments of the present invention have used exemplary resistance values in the common-mode resistance feedback circuit of 10 to 50 Ohms, other values may be employed as well.

Figure 3A:
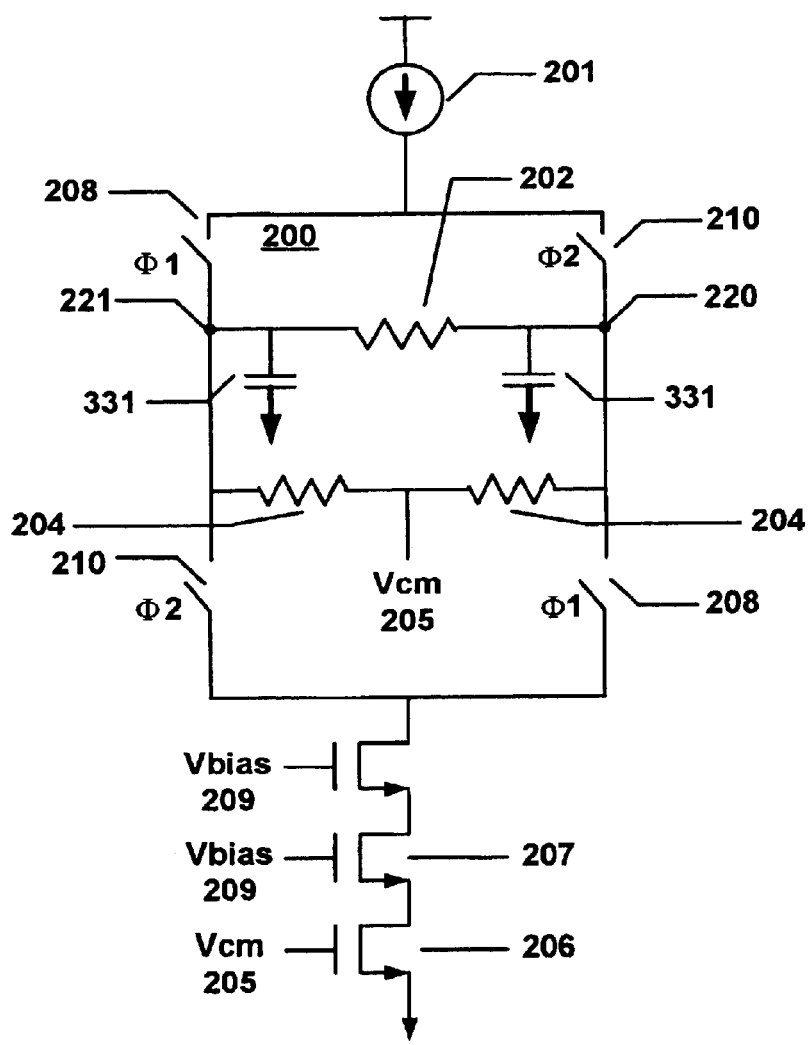
FIG. 3 illustrates an LVDS circuit in accordance with an embodiment of the present invention.

FIG. 3A illustrates another embodiment of the present invention. Here the capacitive part of the LVDS load is realized from the parasitic effects of device implementation and are illustrated by capacitors 331. Here again current from current supply 201 is controlled by switches 208 and 210 to produce the LVDS level voltage difference across LVDS load resistor 202. Common-mode feedback circuit 204 also acts, in this embodiment, to lower output impedance and increase switching speed.

Figure 3B:
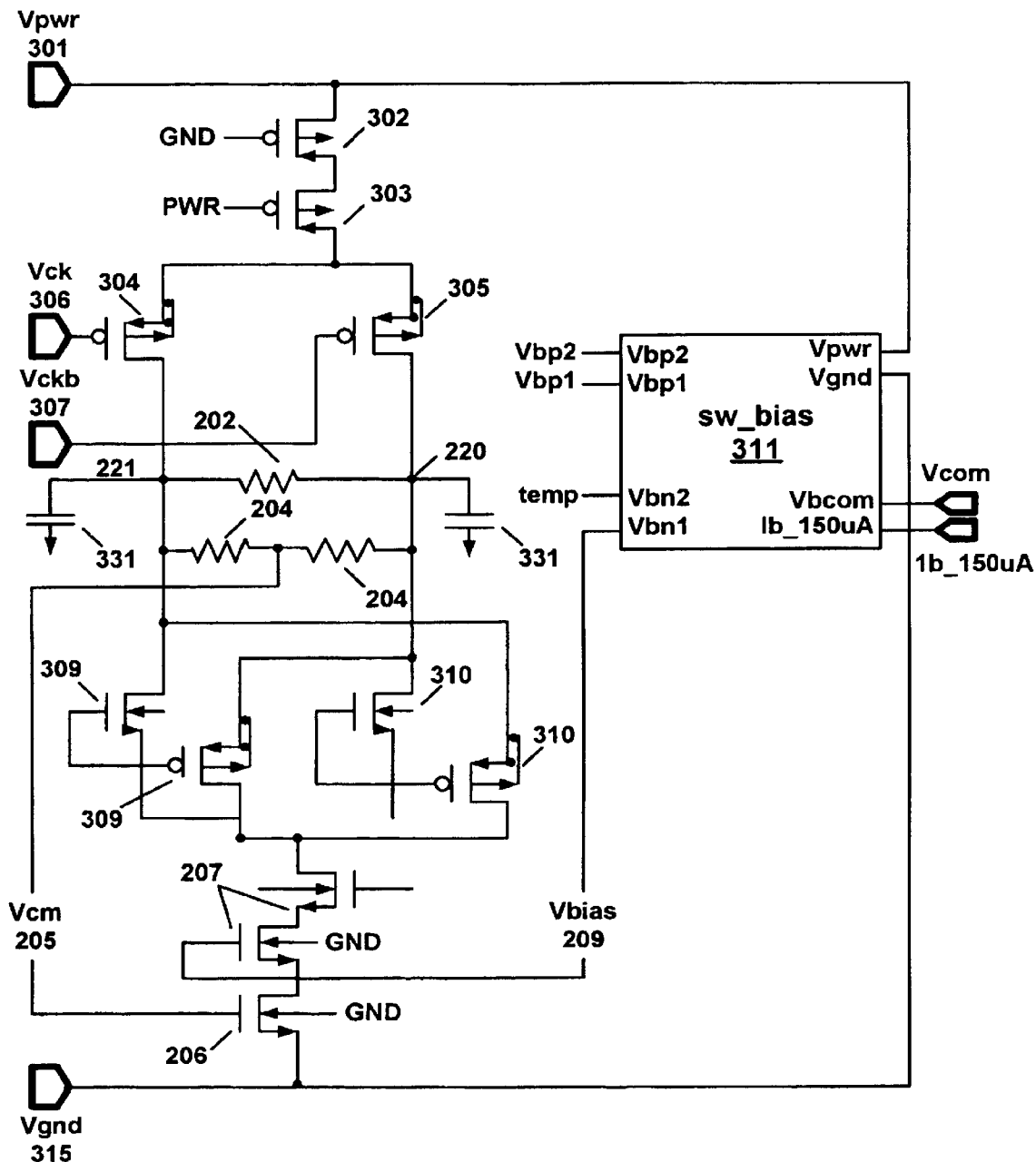

FIG. 3B illustrates a more detailed implementation of one embodiment of the present invention. In the implementation shown here, mosfets 302 and 303 implement current source 201, controlling the power supplied by Vpwr 301. Logical switches 208 and 210 are also implemented by mosfets. Mosfets 304 and 310 implement Φ1 switches 208, under the control of Vck, 306. Mosfets 305 and 309 implement Φ2 switches 210, under the control of Vckb, 307. Mosfets 206 and 207 act as a current sink, under the control of Vbias 209, to control the current flow to ground, 315. Mosfet transistor 206 acts, in conjunction with Vbias cascode circuit 207, as a current mirror to mosfet transistors 302 and 303. Operating at less than saturation currents, Mosfet 206 acts as a resistor and provides current trimming under the control of common-mode feedback voltage, Vcm 205. Switch control logic is provided by sw_bias block 311, which can be implemented in any number of ways. Communication is directed through sw_bias, 311. It is noted here that, though all the transistors illustrated in these embodiments of the present invention are shown as mosfet devices, other embodiments can use other implementations of transistor function.

Also shown in FIG. 3B is LVDS load resistor 202, coupled between output nodes 220 and 221. Common-mode feedback resistance circuit 204 is also shown. Vcm 205, taken from the center tap of common-mode circuit 204, is also shown and Is coupled to the gate of mosfet 206 and, with mosfet 337, implements the current mirror described above. Capacitors 331 illustrate the parasitic capacitance associated with a driver. Again, this capacitance is limited by standard to 5 pF.

The embodiment of the present invention illustrated in FIG. 3B is implemented with common-mode feedback circuit 204. The resistance of common-mode feedback circuit 204 is only seen during transition in the driven signal, either from high to low or low to high, i.e., the AC portion of the LVDS driver operation. During DC, the apparent resistance of the feedback circuit is infinite, thus LVDS load 202 meets the specified load requirement of 100 ohms. During transition, common-mode feedback circuit 204 provided a lowered resistance to the signal current, thus reducing the output impedance of the LVDS driver. The reduced impedance allows for a much improved switching time.

Figure 4:
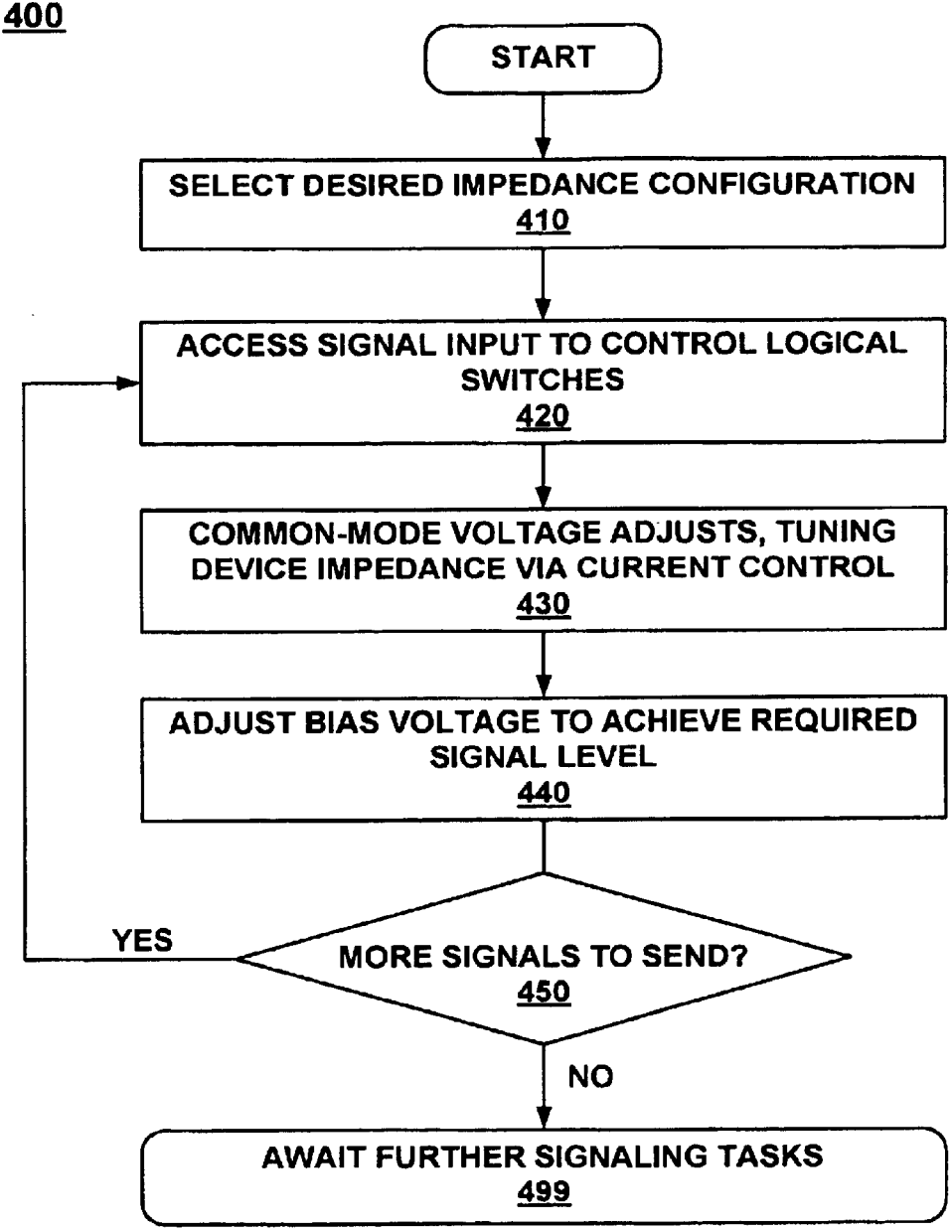
FIG. 4 illustrates a flow chart representation of an LVDS method in accordance with an embodiment of the present invention.

FIG. 4 illustrates a method, 400, of driving an LVDS signal in accordance with embodiments of the present invention. Prior to accessing a signal input, the output impedance of the LVDS driver is selected and the circuit's output impedance is initially tuned to the needs of the application, 410. At 420, a signal is accessed and the biasing of the logical switches is accomplished. At 430, common-mode feedback voltage adjusts to the level driven by the common-mode resistor feedback circuit during signal transition, tuning current control and thus fine tuning output impedance. Signal bias voltage is adjusted at 440 to maintain desired signal bias level. The process continues until the signal stream is completed, 450, then the driver awaits further signaling tasks.

Embodiments of the present invention provide signaling rates greater than 800 MHz by decreasing the output impedance during transition times. This is accomplished while using power supplies of less than 1.8V. The proper signal voltage levels are achieved by the use of the common-mode resistor feedback to control Vcm and drive current sourcing. This eliminates the need for op-amps to control the current sources, which enables both optimum performance at supply voltages of 1.8V, or less, and provides design flexibility to manage speed versus power opportunities. Embodiments of the present invention enable smaller RC delays at the driver output during the signal transition than those afforded by traditional LVDS drivers. Speed and stability are maximized for any given power level.

The architecture enabled by embodiments of the present invention lends itself to significant flexibility because a designer can tune the driver design for a variety of common-mode differential signaling levels. The design can be tuned if different loads are specified, such as lower than the TIA specified maximum of 5 pF LVDS load capacitance as on the BSS LVDS specification.

Higher speeds are possible with embodiments of the present invention because the LVDS load is connected in parallel with a simple common-mode feedback circuit as shown above at 104. Incorporating a resistive common-mode feedback circuit enables a smaller resistance seen at the driver's output nodes. This decreases the dominant impedance, the LVDS load, during transition, thus increasing the maximum potential speed for any given power level.

The design approach exhibited in embodiments of the present invention can enable the use of sub-1.8V supply voltages. It is noted that the absolute number is process dependent. Lower Vtp processes enable even lower Vdd operation. Because the circuit uses no op-amps to control the current mirrors, there are fewer power supply induced limitations on such a circuit.

Embodiments of the present invention enable an LVDS driver design to be programmable with respect to a specified load. The size of the common-mode feedback resistors can be adjusted to accommodate higher or lower capacitive loads than those specified by the LVDS standards. Should future differential drivers enable signaling at lower common mode voltages, a structure such as explained herein can be easily modified to accommodate such a circuit.

It is noted that the 100-ohm, 5 pF load of a typical LVDS driver creates a 500 ps (pico second) RC delay that is managed by the driver to meet desired operating speeds. Through the use of a common mode feedback circuit such as that described herein, a small resistance is inserted in parallel with the LVDS load to decrease the effective LVDS impedance and therefore decrease the delay inherent in the load. Resistances of 25 to 40 ohms have been found in some embodiments to enable the LVDS load induced delay to be decreased by as much as 70 percent. An impedance in this range still allows the driver to meet the TIA specified short circuit current specifications.

The resistance acts as a common-mode feedback circuit for the current sources. The current sources provide ample current to allow the LVDS signaling levels to be met. This approach eliminates the need for op-amp control of the current sources. The common-mode feedback does an adequate job of controlling the current sources without the need of an active controller. This enables operation at lower power supply voltages.

Embodiments of the present invention also enable operating at a wider range of operating temperature than otherwise possible. This benefit is provided by eliminating the need for op-amps driving the current sources, such as those shown at 101 and 106.

It is the use of a common-mode feedback impedance which enables the current sources to be constructed without op-amp control. This enables lower voltage power supply operation and, by eliminating the need for the previously required op-amps, allows for operation as a single-pole device, thus enhancing speed and stability.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A system for driving a low voltage differential signal comprising:

a current source;

a driver circuit coupled to said current source and controlled by logical switches, wherein said driver circuit comprises a common-mode resistor feedback circuit for reducing an output impedance of said driver circuit during transitions in said low voltage differential signal;

a current mirror coupled to said driver circuit and controlled by a feedback voltage of said common mode resistor feedback circuit; and a bias voltage source coupled to said current mirror and enabled to control said current mirror.

2. The system for driving a low voltage differential signal described in claim 1, wherein said driver circuit further comprises a capacitive load.

3. The system for driving a low voltage differential signal described in claim 1, wherein said driver circuit further comprises a resistive load.

4. The system for driving a low voltage differential signal described in claim 1, wherein said current source is controlled by said feedback voltage of said common-mode resistor feedback circuit.

5. The system for driving a low voltage differential signal described in claim 1, wherein said common-mode resistor feedback circuit enables tuning said output impedance of said driver circuit.

6. The system for driving a low voltage differential signal described in claim 1, wherein said driver circuit is enabled to operate in a single pole mode.

7. The system for driving a low voltage differential signal described in claim 1, wherein said driver circuit further comprises:

a resistive load; and a parasitic capacitance of said system.

8. A low voltage differential signal driver circuit, comprising:

an electronic load circuit coupled to said current source, wherein an output signal is generated as a function of a direction of a current flowing through said electronic load circuit;

logic controlled switches coupled to said current source, for selectively controlling said direction of said current flowing through said electronic load circuit;

a common-mode resistor feedback circuit coupled to said electronic load circuit for generating a common mode voltage and for reducing an output impedance during transitions of said output signal; and a current mirror coupled to said electronic load circuit for controlling said current as a function of said common mode voltage.

9. The low voltage differential signal driver circuit according to claim 8, further comprising a current source coupled to said electronic load circuit for supplying said current.

10. The low voltage differential signal driver circuit according to claim 8, further comprising a bias voltage source coupled to said current mirror for further controlling said current.

11. The low voltage differential signal driver circuit according to claim 8, wherein said low voltage differential signal driver circuit is enabled to operate in a single pole mode.

12. The low voltage differential signal driver circuit described in claim 8, wherein said common-mode resistor feedback circuit is coupled in parallel with said electronic load circuit.

13. The low voltage differential signal driver circuit described in claim 12, wherein said electronic load circuit comprises a resistive load.

14. The low voltage differential signal driver circuit described in claim 12, wherein said electronic load circuit comprises a capacitive load.

15. A method for driving a low voltage differential signal, comprising:

selectively controlling a direction of a current through an output impedance as a function of an input signal;

generating a differential output signal as a function of said direction of said current through said output impedance;

generating a common mode feedback signal as a function of said differential output signal;

controlling said current as a function of said common mode feedback signal and as a function of a bias voltage; and modifying said output impedance during transitions of said differential output signal.

16. The method according to claim 15, wherein said modifying said output impedance is accomplished by varying a resistance of said output impedance.

17. The method according to claim 15, wherein said modifying said output impedance is accomplished by varying a capacitance of said output impedance.

* * * * *